US009824153B1

(12) United States Patent
Liang et al.

(10) Patent No.: US 9,824,153 B1
(45) Date of Patent: Nov. 21, 2017

(54) SYSTEMS AND METHODS FOR DETERMINING THE SUFFICIENCY OF A CURRICULUM IN MEETING STANDARDS

(71) Applicant: Virtual Classroom Associates LLC, Saddle Brook, NJ (US)

(72) Inventors: Ernest S. Liang, Saddle Brook, NJ (US); James E. Ellis, Gainesville, FL (US); Heddy M. Vernon, Gainesville, FL (US)

(73) Assignee: Virtual Classroom Associates, LLC, Jersey City, NJ (US)

( * ) Notice: Subject to any disclaimer, the term of this patent is extended or adjusted under 35 U.S.C. 154(b) by 238 days.

(21) Appl. No.: 14/549,872

(22) Filed: Nov. 21, 2014

Related U.S. Application Data (60) Provisional application No. 61/907,225, filed on Nov. 21, 2013.

(51) Int. Cl.
*G06F 17/30* (2006.01)
*G06Q 10/06* (2012.01)

(52) U.S. Cl.
CPC .............................. *G06F 17/30867* (2013.01)

(58) Field of Classification Search
None
See application file for complete search history.

(56) References Cited

U.S. PATENT DOCUMENTS

| | | | | |
|---|---|---|---|---|
| 8,632,340 B1 * | 1/2014 | Schugren | ................ | G09B 7/02 434/118 |
| 2001/0053513 A1 * | 12/2001 | Corn | ..................... | G06Q 30/02 434/350 |
| 2004/0009461 A1 * | 1/2004 | Snyder | ............ | G06Q 10/06311 434/350 |
| 2009/0280464 A1 * | 11/2009 | Corn | ....................... | G09B 5/00 434/350 |
| 2010/0004944 A1 * | 1/2010 | Palaniappan | .......... | G06Q 10/10 705/1.1 |
| 2010/0217766 A1 | 8/2010 | Perlin et al. | | |
| 2011/0070573 A1 * | 3/2011 | Dennis | .................... | G09B 5/00 434/433 |
| 2013/0254660 A1 * | 9/2013 | Fujioka | ................... | A63F 13/12 715/707 |
| 2014/0017653 A1 * | 1/2014 | Romney | .................. | G09B 7/00 434/350 |

(Continued)

*Primary Examiner* — Wilson Lee
(74) *Attorney, Agent, or Firm* — Stephen C. Thomas; Courtney Dunn (57) ABSTRACT

A system and method for analyzing curricular materials to determine the sufficiency of a curriculum in meeting a set of standards. Curricular materials are imported into a database which can include converting the curricular materials into electronic form and converting any non-text material to text, tagging all text with identifying information and saving it to a database. Standards are imported and used to develop a plurality of search queries. Creating the search queries can comprise dividing the standards into criteria, creating a rubric based on the criteria, creating a syllabus comprised of syllabus elements based on the rubric, and then creating the search query based on the syllabus. The search queries are performed on the database. A grade on the effectiveness of the curricular materials in meeting the standards can be assigned. The results can be delivered to a user via a user interface.

12 Claims, 9 Drawing Sheets

(56) References Cited

U.S. PATENT DOCUMENTS

| | | | |
|---|---|---|---|
| 2014/0220535 A1* | 8/2014 | Angelone | G09B 5/00 434/350 |
| 2014/0279598 A1* | 9/2014 | Chapman | G06Q 30/018 705/317 |
| 2015/0026081 A1* | 1/2015 | Colebank | G06Q 30/018 705/317 |

* cited by examiner

National Science Education Standards Grades 5-8

Earth and Space Science
- Structure of the earth system
- Earth's history
- Earth in the solar system Physical Science
- Properties and changes of properties in matter
- Motions and forces
- Transfer of energy Life Science
- Structure and function in living systems
- Reproduction and heredity
- Regulation and behavior
- Populations and ecosystems
- Diversity and adaptations of organisms Science and Technology
- Abilities of technological design
- Understandings about science and technology Science in Personal and Social Perspectives
- Personal health
- Populations, resources, and environments
- Natural hazards
- Risks and benefits
- Science and technology in society History and Nature of Science
- Science as a human endeavor
- Nature of science
- History of science Science as Inquiry
- Abilities necessary to do scientific inquiry
- Understandings about scientific inquiry

FIG. 9

SYSTEMS AND METHODS FOR DETERMINING THE SUFFICIENCY OF A CURRICULUM IN MEETING STANDARDS

CROSS REFERENCE TO RELATED APPLICATION

This application claims priority to U.S. Provisional Application No. 61/907,225, filed Nov. 21, 2013, entitled "Systems and Method for Determining the Sufficiency of a Curriculum in Meeting Standards", which is hereby incorporated by reference herein in its entirety.

FIELD OF INVENTION

The present disclosure generally relates to accreditation standards; more specifically to methods and systems for determining the sufficiency of a curriculum in meeting a set of standards.

BACKGROUND

Educational institutions are often required to meet standards set by an outside organization. For example, accredited pharmacy schools must meet the standards set by the Accreditation Council for Pharmacy Education (ACPE). Organizations like ACPE require new schools seeking accreditation to submit a new application for accreditation and previously-accredited schools to periodically go through a reaccreditation process. In both cases, the accrediting organization will generally require schools to demonstrate that their curriculum and/or that the material actually being covered in the classroom meets or exceeds the standards set by the accrediting organization.

Currently, the process for determining if an educational institution meets a set of standards is, for the most part, a manual process. The process is so cumbersome that some schools have dedicated staff members responsible for leading what can be a multi-year process. This process typically involves assessing how well a school has performed against the standard-setting body's curricular requirements. The latest practice for completing these assessments often includes conducting faculty and student interviews, gathering curricular materials including syllabi, presentations, assigned readings, assessments, reviewing these curricular materials (sometimes with the aid of technology like electronic search), and fact checking. This process is subject to significant human error. For example, faculty interviews can introduce significant error by, for example, omitting critical information or inadvertently misrepresenting what was actually taught in the classroom. Furthermore, the interviewers themselves may introduce error into the process because, for example, they lack sufficient time/resources to perform a comprehensive interview or gather data or they may inadvertently misinterpret the gathered data.

Because curriculum evaluation is based largely on subjective human interpretation of data, the process is not only subject to human error, it is also time-consuming and expensive. The process of setting up meetings with faculty, interviewing them and following up over the course of several years is a time-consuming process that translates into high labor costs and opportunity costs (taking time away from faculty members who could otherwise be conducting research, writing grant proposals, teaching, etc.).

There are a number of other shortfalls of the current process. The process for determining if a curriculum meets a set of standards is not easily audited. For example, in the case of the accreditation/reaccreditation process, an accrediting body's decision relies heavily on reports by the schools themselves. These reports may present the results of the school's analysis of data, but may not make the data itself readily available for audit. In addition, the data gathered for the analysis is often stored in multiple locations making it difficult to access and analyze.

DETAILED DESCRIPTION OF THE EMBODIMENTS

A detailed description of embodiments for a method and system of analyzing a plurality of curricular materials to determine the sufficiency of the curriculum in meeting a set of standards will now be presented with reference to FIGS. 1-9. One of skill in the art will recognize that these embodiments are not intended to be limitations on the scope, and that modifications are possible without departing from the spirit thereof. In certain instances, well-known methods, procedures, components, and circuits have not been described in detail.

Figure 1:
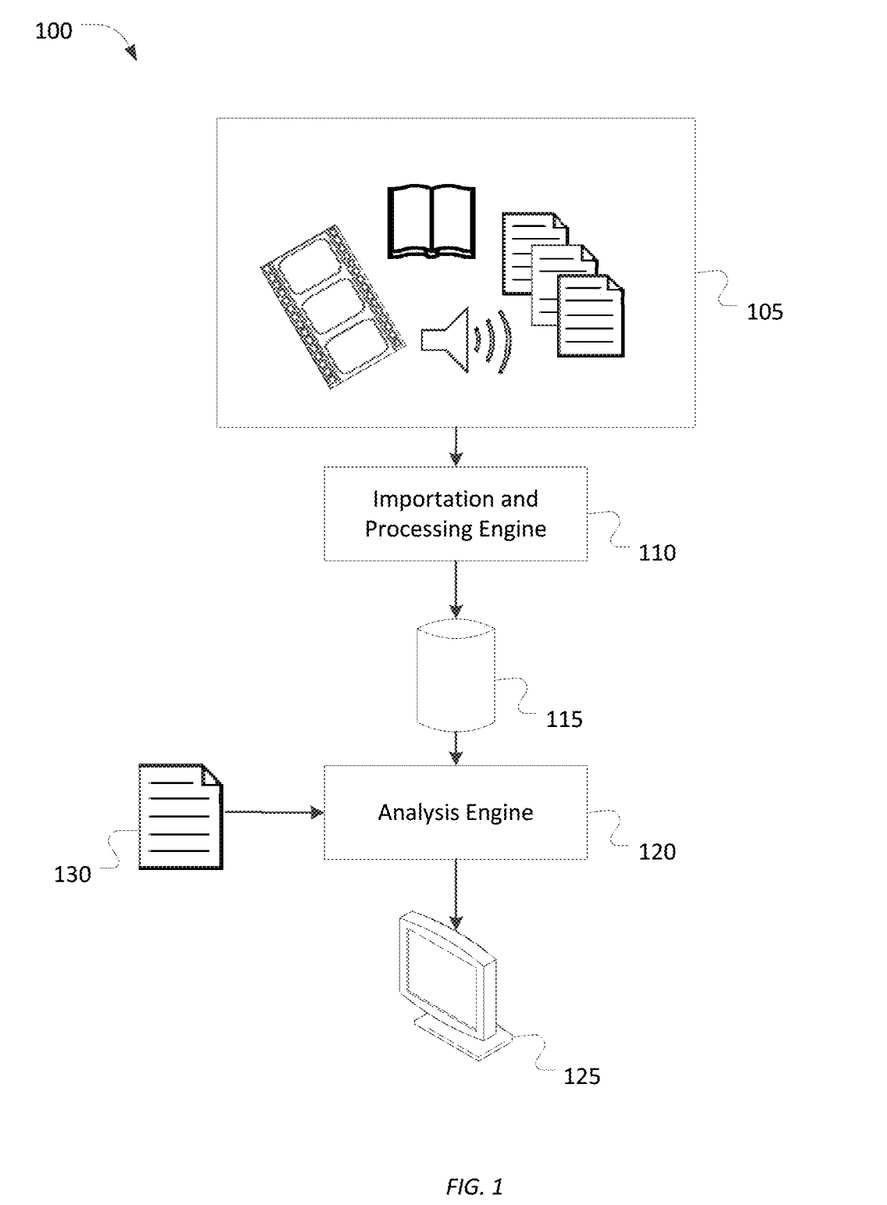
FIG. 1 is flowchart of a system for analyzing a plurality of curricular materials to determine the sufficiency of curricular in meeting a set of standards according to an exemplary embodiment of the present invention.

An embodiment of the system is shown in FIG. 1. Curricular materials 105 are gathered and imported into the system. Examples of curricular materials 105 include any written, electronic, photographic, videographic or other form of information comprising, for example and not by way of limitation: syllabi; slide decks; video or audio recordings of presentations; reading materials (e.g. textbooks); assessments (e.g. quizzes, tests, and exams); lesson plans; and observation guides. During importation, which occurs in operation 110, curricular materials 105 are loaded into the system and stored in searchable database 115 and processed. After importation and processing in operation 110, curricular materials 105 are ready for analysis in operation 120. Standards 130, which may be provided by a standard-setting organization, can then be imported into the system. Curricular materials 105 are then analyzed, in operation 120, against these standards and the results of the analysis are provided to the user, via, for example, a report produced by analysis engine 120 and which may be presented to the user in the form of a graphics display on monitor 125 or in tangible form such as, for example, a computer printed report.

Embodiments of the invention may be used by academic institutions to determine the sufficiency of academic curricular materials in meeting academic accreditation standards for accreditation and/or reaccreditation purposes. Embodiments may also be used by accrediting organization to assess and audit member institutions. Embodiments may also be used to determine the sufficiency of meeting other types of standards, such as, for example, continuing education standards, non-degree education standards, and workforce training standards.

Figure 2:
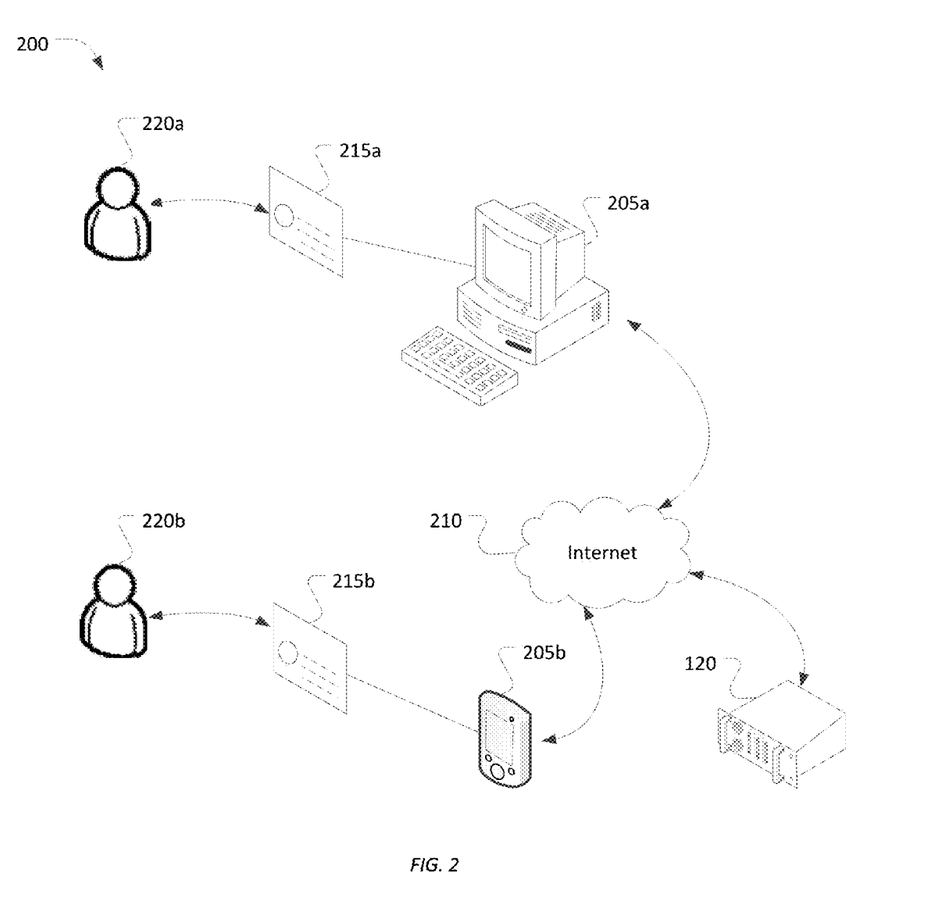
FIG. 2 is a diagram of an exemplary system upon which the method of analyzing a plurality of curricular materials to determine the sufficiency of a curriculum in meeting a set of standards may be executed according to an embodiment of the present invention.

FIG. 2 is a diagram of exemplary system 200. It should be understood, however, that a system as illustrated and hereinafter described is merely illustrative of a system that could benefit from embodiments of the invention, and therefore, should not be taken to limit the scope of the invention. While an embodiment of the system is illustrated for purposes of example, other configuration of systems can readily employ embodiments of the invention. As illustrated, exemplary system 200 can include one or more user computing devices (e.g. user computer 205a and user mobile device 205b). User computing devices 205a and 205b can each comprise a user interface for providing output and/or receiving input. User computing devices 205a and 205b can each comprise an output device such as a display which is coupled to the processor. The user input interface, which allows user computing devices 205a and 205b to receive data, can comprise means, such as one or more devices that may allow user computing devices 205a and 205b to receive data, such as a keypad, a touch display, for example if the display comprises touch capability, and/or the like. User computing devices 205a and 205b can be connected by conventional access hardware to an external communication network which may be any network, but can be the internet 210 as depicted in the exemplary embodiment of the invention 200 depicted in FIG. 2. Exemplary system 200 can also include an input mechanism such as website 215a or app 215b running on user computing devices 205a and 205b. Website 215a and app 215b can prompt a user to enter information into the system and can display information and results to users 220a and 220b, respectively. Website 215a and/or app 215b can be in bi-directional communication with one or more electronic devices, such as server 120, via internet 210.

The one or more electronic devices of an exemplary embodiment need not be the entire electronic device, but can be a component or group of components of the electronic device in other exemplary embodiments. The electronic device can comprise a processor or other processing circuitry. As used in this application, the term 'circuitry' refers to at least all of the following: hardware-only implementations (such as implementations in only analog and/or digital circuitry) and to combinations of circuits and software and/or firmware such as to a combination of processors or portions of processors/software including digital signal processor(s), software, and memory(ies) that work together to cause an apparatus, such as a computer, to perform various functions and to circuits, such as a microprocessor(s) or portion of a microprocessor(s), that require software or firmware for operation, even if the software or firmware is not physically present. This definition of 'circuitry' applies to all uses of this term in this application, including in any claims.

As a further example, as used in this application, the term "circuitry" can also include the implementation of merely a processor, multiple processors, or portion of a processor and its (or their) accompanying software and/or firmware.

Further, the processor(s) can comprise functionality to operate one or more software programs by executing computer-readable instructions which can be stored in memory and which can, among other things, cause the processor to implement at least one embodiment including, for example, one or more of the functions or operations described herein. The electronic device can comprise a user interface for providing output and/or receiving input. The electronic device can comprise an output device such as a display which is electrically coupled to the processor. The user input interface, which allows the electronic device to receive data, can comprise means, such as one or more devices that can allow the electronic device to receive data, such as a keypad, a touch display, for example if the display comprises touch capability, a microphone for voice input used in conjunction with voice recognition computer readable instructions stored in the memory(ies) of the invention, and/or the like.

The electronic device can comprise a computer-readable non-transitory memory device in electrical communication with the processor(s) of the invention including, in one embodiment, volatile memory, such as volatile Random Access Memory (RAM) including a cache area for the temporary storage of data. The electronic device can also comprise other computer-readable non-transitory memory, for example, non-volatile memory, which can be embedded and/or can be removable. The non-volatile memory can comprise an EEPROM, flash memory or the like. The memories can store any of a number of pieces of information, which may include data, computer-readable instructions, or any other information as is known in the art as storable in computer-readable memory. The information and data stored in the computer-readable memory(ies) of the invention can be used by the electronic device to implement one or more functions of the electronic device. The electronic device can be connected by conventional access hardware to the internet. Such access may be wired or wireless, such as, for example, optical or Radio Frequency (RF) data communications as is known in the electrical arts.

Figure 3:
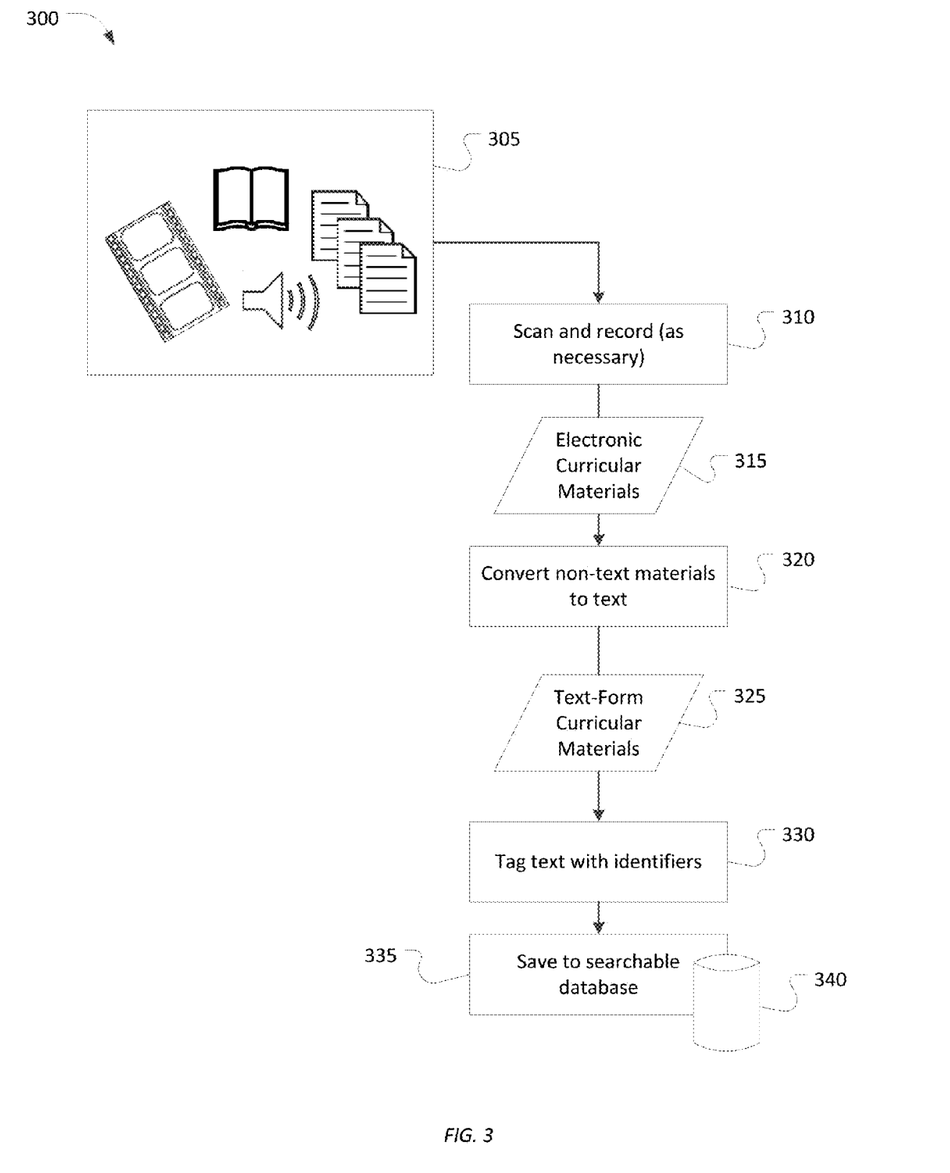
FIG. 3 is a flowchart of a method of loading and processing curricular materials into a searchable database according to an embodiment of the present invention.

An exemplary importation and processing method, method 300, which could be used for operation 110 of FIG. 1, is shown in FIG. 3. For importation, in operation 310, curricular materials 305 are scanned or recorded as necessary to create electronic records 315 of curricular materials 305. For example, electronic documents are imported directly into the system and hard copy documents are scanned in to the system, whereas non-electronic audio and video recordings are recorded by the system. In operation 320, any non-text materials in the electronic curricular materials are then converted into text format creating text-form curricular materials 325. A number of technologies, including data or screen scraping, optical character recognition (OCR), and speech-to-text, are used, in any combination, to convert the materials into text form. For example, video that includes text is imported into the system using screen scraping and OCR, audio is loaded into the system using speech to text technology, and hardcopy documents are imported using scanning and OCR technologies. Materials such as electronic documents, spreadsheets, slide decks, images, web-based materials, and materials imported from other electronic databases are also converted to text form.

In an exemplary embodiment, the content of each piece of text-form curricular material 325 that is imported into the system is stored as one or more strings. The one or more strings for a single piece of curricular material are grouped together as an object. Each object can be tagged, in operation 330, with identifying information (e.g. metadata) and saved to searchable database 340 in operation 335. The searchable database may comprise any computer readable medium. The identifying information can include, for example, the date the material was used, instructor name(s), course name(s), media identifications, lecture title, categories, and the source of the information. Example categories include student learning outcomes, which may be from a syllabus. The identifying information can also include links, such as hyperlinks, or other methods that allow users to access a copy of the original curricular material. Once curricular materials have been imported into the system and stored in the searchable database, the data can be analyzed by the system to provide, for example, grading on how well a particular concept has been taught within a curriculum. Custom reports can also be generated. In order to analyze the data and provide grading and customized reports, custom search queries are created by the system.

Concepts that must be taught in a curriculum as specified by a standard-setting organization (e.g. standards) can be used to create custom search queries. Natural language processing, vocabulary and phrase matching (similar to use of a thesaurus), machine learning, and other artificial intelligence technologies can be employed to create these custom search queries. Methods similar to those used in semantics can also be used. A user can also manually create database search queries or review and refine previously and/or automatically generated search queries.

Figure 4:
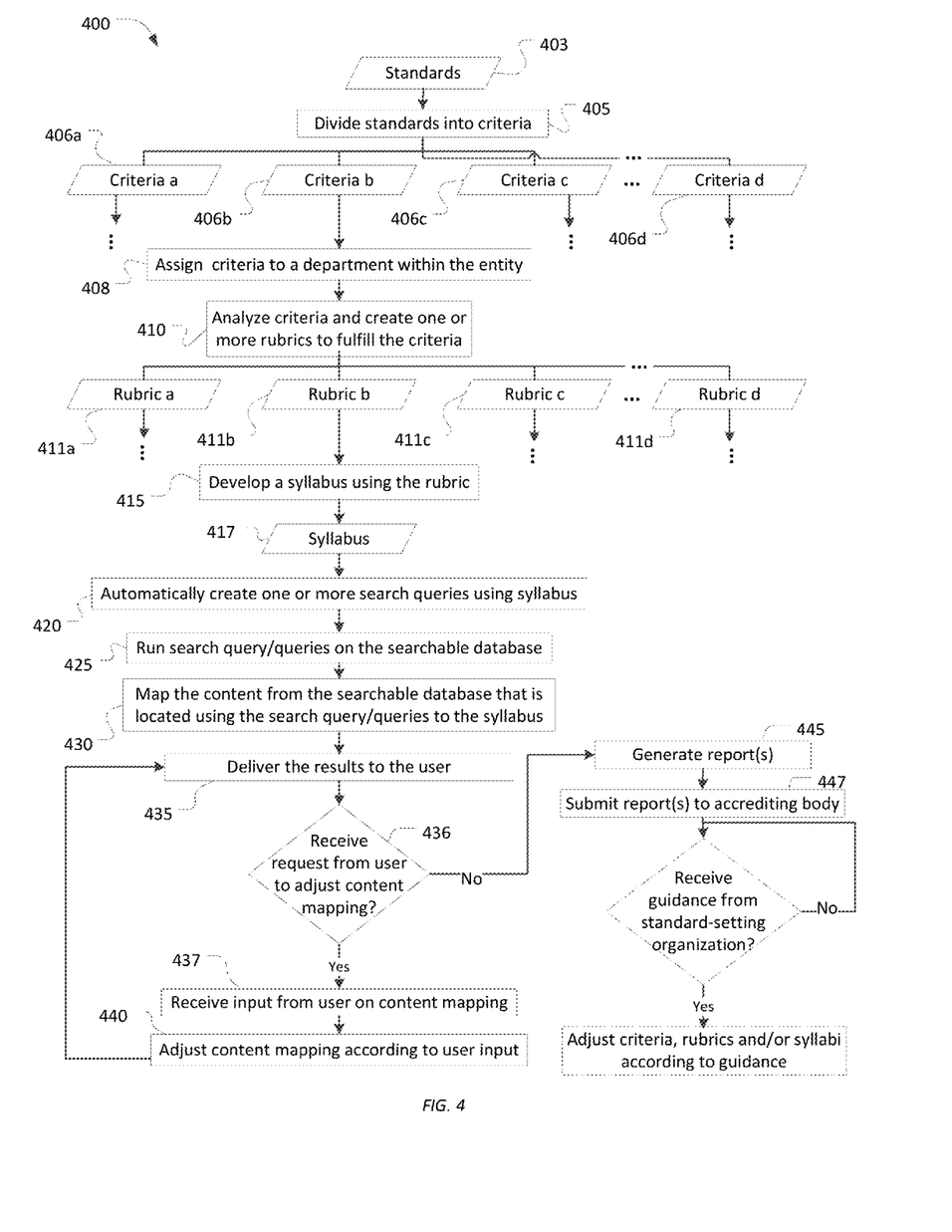
FIG. 4 is a flowchart of a method of importing and processing a set of standards and analyzing the content of the searchable database against the set of standards to determine the sufficiency of a curriculum in meeting the set of standards according to an embodiment of the present invention.
Figure 5:
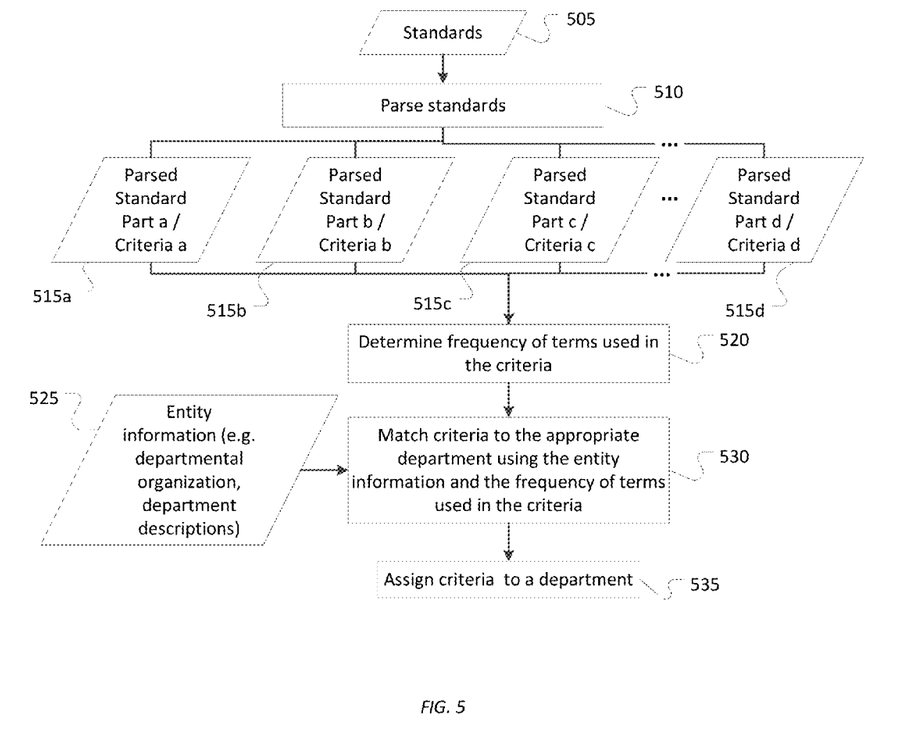
FIG. 5 is a flowchart of a method of developing criteria and assigning criteria to an appropriate department within an entity according to an embodiment of the present invention.

An exemplary method of importing standards, developing these customized search queries from the standards and analyzing the content of the searchable database to determine the sufficiency of the curriculum in meeting the set of standards (method 400), which could be used for operation 120 of FIG. 1, is shown in the flowchart of FIG. 4. Standards 403, which may be in the form of a standards documents, are entered into the system. Standards 403 include a number of conditions that should be met for an entity to be approved by a standard-setting organization. Once entered into the system, standards 403 are divided into a number of criteria 405. The division 405 can be based on the organizational structure of the entity. Although any number of criteria can result from the division, criteria 406a-406d are shown and described here. In operation 408, criteria 406b can be matched to a department within the entity, as applicable. The division and matching can be done automatically by the system using natural language processing, vocabulary and phrase matching (similar to use of a thesaurus), machine learning, and other artificial intelligence technologies or by user. For example, as illustrated in FIG. 5, if a standard-setting organization uses a structured format in its standards (e.g. chapter/section/paragraph format), the system can parse the standards into its components (e.g. chapters, sections, and paragraphs). A portion of the parsed components (e.g. the chapters) become the criteria. As shown in FIG. 5, standards 505 are parsed, in operation 510, into criteria 515a-515d. The system can then determine, in operation 520, the frequency of one or more terms that occur in criteria 515a-515d. This term frequency information can be stored for use in later operations. Entity information 525, including the departmental organization of the entity, can be imported into the system. Entity information is used to establish the organization structure and define what each department is responsible for. Entity information may come from organizational charts, descriptions of a department's roles and responsibilities and descriptions of the resources available to a department. The system can then use the entity information and the information on the frequency of the appearance of terms in the parsed standards to match the criteria to the appropriate department in operation 530. The criteria can then be assigned to the matching department in operation 535. The results can also be presented to the user for manual adjustment. If a user is to perform this step, the user will be prompted through the interface (e.g. a website) to divide and assign the material.

Referring again to FIG. 4, once each of the criteria has been assigned to a department, each of the criteria that results from the division is analyzed to create one or more rubrics. In this exemplary embodiment, criteria 406a-406d would each be used to develop one or more rubrics. For simplicity only the processing of criteria 406b is shown and described. Criteria 406b is analyzed in operation 410 to create rubrics 411a-411d. The rubrics can identify what standard(s) needs to be taught. Each of rubrics 411an-411d includes one or more elements that fulfill criteria 406b. Other information that was included in standards 403 and related to criteria 406b can also be used to create rubrics 411a-411d. The rubric elements can be weighted to provide context as to the relative importance of the rubric elements in meeting criteria 406b. Rubric creation and weighting can be done automatically by the system using natural language processing, vocabulary and phrase matching (similar to use of a thesaurus), machine learning, or other artificial intelligence technologies. For example, the system can create a score, such as a numerical score, that represents the relative weighting of each of rubrics 411a-411d to fulfill criteria 406b. The frequency with which terms appear in the parsed standards data, which was gathered in a previous operation as described above, can be used in creating the score. Methods similar to those used in semantics can also be employed to create the score. The results can also be presented to the user for manual adjustment. Alternatively, rubric creation and weighting can be performed by a user. If a user performs this step, the user will be prompted through the interface (e.g. website) to create the rubric and assign appropriate weights.

Next, a syllabus, which can identify how a standard is taught, is created. Each of rubrics 411a-411d can be used to develop a syllabus. Each syllabus includes a list of one or more objectives. Although development of a syllabus can be done for each of rubrics 411a-411d, for simplicity, only the creation of a syllabus from rubric 411b is shown and described herein. In operation 415, syllabus 417 is created from rubric 411b. Each objective in syllabus 417 is weighted according to the relative importance of the objective to meeting criteria 406b. Syllabus objectives that occur less frequently (and thus would have lower weight) but have an overall higher importance in meeting accrediting standards, can be identified. This can be done by tagging such objectives. Creation of the syllabus and identifying important syllabus objectives that have low weights can be done automatically by the system using natural language processing, vocabulary and phrase matching (similar to use of a thesaurus), machine learning, and other artificial intelligence technologies or by a user. For example, to perform this automatically, a keyword search on the syllabus objectives can be performed using a pre-defined database or list that includes a weight for each keyword. If a user is to perform this step, the user will be prompted through the interface (e.g. website) to create the syllabus or goal list and assign each item the appropriate weight.

Syllabus 417 can then be used in operation 420 to automatically create one or more search queries. The search terms can, for example, be pulled from syllabus 417 or rubric 411b and the importance (or weight) of each determined by the number of times the term appears in syllabus 417, rubric 416, criteria 406b or standard 403. Search terms can also be provided directly from the standard-setting organization. In operation 425, these search queries can be run against the searchable database. In operation 430, the content that results from search queries 425 can be mapped to syllabus 417 using keyword and phrase matching. This can be done by associating or linking an object (located in the searchable database) that contains all of the strings for a single piece of curricular material to syllabus 417 or to a particular objective in syllabus 417. In operation 435, the results of the mapping can be delivered or displayed to the user. The mapping results can be, for example, a report showing the results of the search queries organized by each syllabus objective. The mapping can be reviewed and adjusted by the user. The user can then request adjustment of the content mapping. If a request is received from the user to adjust the mapping of the content in operation 436, input on the mapping is received from the user in operation 437 and the mapping is adjusted according to the user input in operation 440. The adjusted results are returned to the user in operation 435 and the process can be repeated any number of times.

Once a user is satisfied with the content mapping, reports, which may contain data such as the exemplary metrics described below, can be generated in operation 445. The reports can then be submitted to a standard-setting organization in operation 447. The reports can be reviewed and guidance can be provided in operation 450 for increasing the entity's compliance, as necessary. The criteria, rubrics and/or syllabus can be adjusted according to this guidance, as applicable, in operation 455.

Exemplary metrics that can be measured and reported include, for example, the number of times a concept was taught or mentioned in the curricular materials, context in which a term is used (e.g. based on the time a topic is discussed within a presentation, location of term on a document, and the tone/sentiment of content around the term), the quality of the source of the material (determined using, for example, citations), and the relevance to other curriculum terms.

These metrics can be weighted by importance and a grade on how well a particular concept has been taught can be determined based on the metrics and their relative weights. Grading scales can be adjusted and tuned for each standard-setting organization's requirements. Grades can be assigned, for example, each time a search query is completed or each time the content mapping is adjusted. Other reported information can include the context in which a topic was taught, support materials that were presented to students, and learning opportunities that were presented to students.

Exemplary embodiments can generate a variety of reports, including reports based on templates supplied by standard-setting organizations (e.g. grading reports), custom reports that can be configured by a user, best practices reports (which are created by analyzing curricula across several entities for a particular field of study), reports on unique versus redundant concepts that are being taught across a body of work, and degree reports (which display the learning objectives that will be taught by year/course). Reports can be provided to the user in electronic and hardcopy formats. Reports in electronic formats include live links that provide immediate electronic access to the underlying data that include search results that are presented with text excerpts, thumbnail images of content, time codes, and links that take users directly to associated content.

In the case of accreditation, exemplary embodiments can track the changes in curriculum between accreditation/reaccreditation cycles. Changes in curriculum can be indicated in the appropriate categories within the accrediting body's reporting template and can assist accrediting bodies with auditing an entity's progress toward improving performance. Additionally, exemplary embodiments track the progress of entities that fail the accreditation/reaccreditation process. This curriculum tracking feature can provide entities with a head start in subsequent reaccreditation cycles that require a self-study report.

Standard-setting organizations change their standards periodically. Exemplary embodiments can track these changes, adjust the database search queries accordingly, and automatically identify areas within a curriculum that may be out of compliance. In an exemplary embodiment, revised standards are compared with original standards. Changes in the standards can include deletions, additions, and modifications. Deleted standards can be flagged and all of the associated criteria, rubrics, syllabi and other materials can be deactivated or removed. New (or added) standards and modified standards can be divided into criteria, matched to the appropriate department, converted to rubrics and used to create syllabi and then search queries in a similar manner to the import of standards described above. The resultant criteria, rubrics, syllabi, grades, and other elements of the original standards can be compared against the same elements for the revised standards and the differences, which may indicate a curriculum that is out of compliance, reported to the user, such as, for example, in the form of a report.

Exemplary embodiments provide alerts and notifications that can be sent automatically based on a variety of triggers including, for example, when a curriculum is out of compliance, when a change in curricular requirements has been made by a standard setting organization, or when certain deadlines are approaching during the standard analysis (or accreditation/reaccreditation) process.

Figure 6:
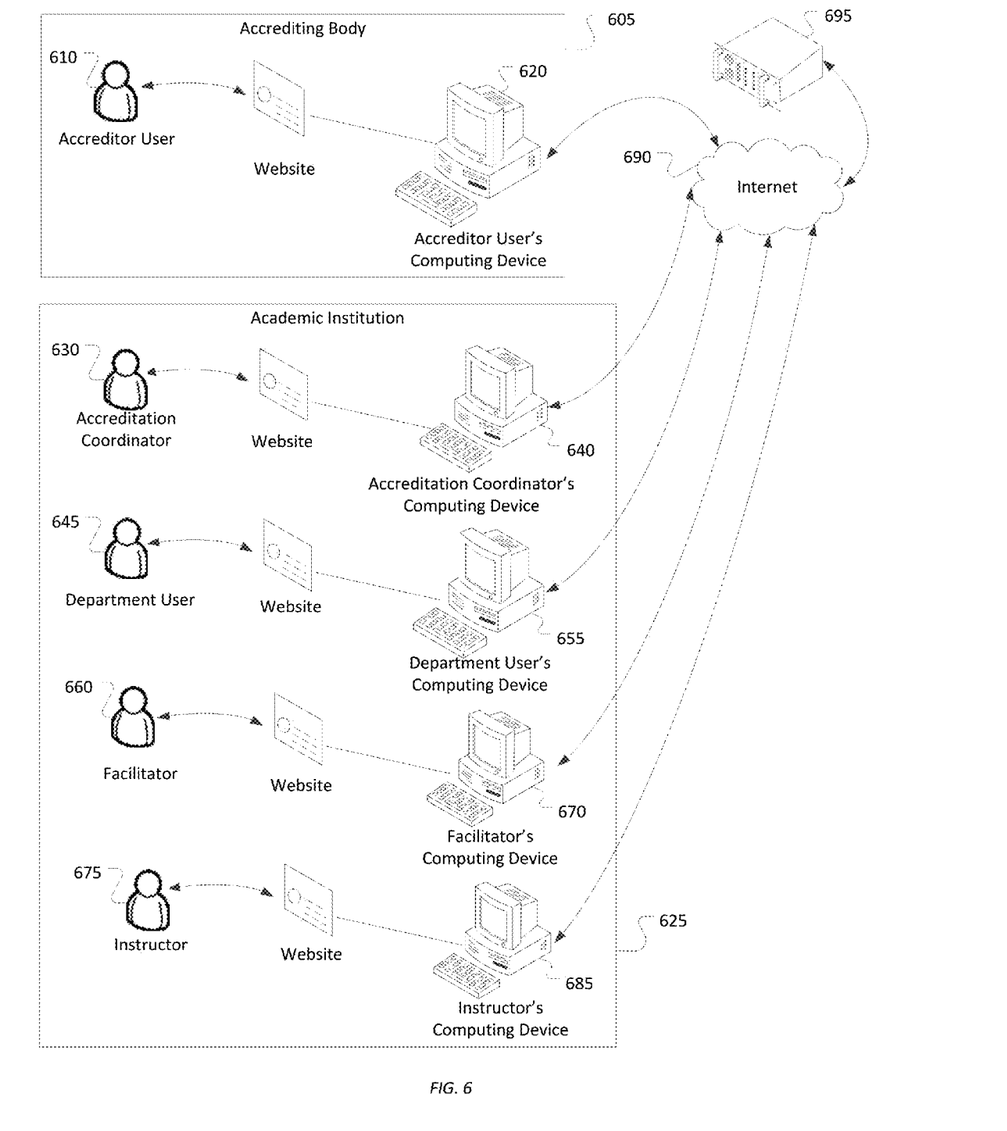
FIG. 6 is a diagram of an exemplary system upon which a method of analyzing a plurality of curricular materials to determine the sufficiency of a curriculum in meeting a set of standards may be executed according to an embodiment of the present invention.

FIG. 6 is a diagram showing system 600 according to an exemplary embodiment. In this exemplary embodiment the entity is academic institution 625 and the standard-setting organization is accrediting body 605. These are given for exemplary purposes only and the type of entity may be any entity that is attempting to meet a set of standards and the standards organization may be any entity that promulgates a set of standards. Here, multiple users in academic institution 625 access a website over multiple computing devices to input data and receive results. As shown, system 600 may include access by accreditor user 610 at accrediting body 605. Accreditor user 610 may input standards, receive a report on academic institution 625, or provide guidance to academic institution 625 via the website on accreditor user's computing device 620. System 600 may further include one or more users at academic institution 625. For illustrative purposes, shown here are accreditation coordinator 630, department user 645, facilitator 660, and instructor 675.

Accreditation coordinator 630 can divide the standards documents, generate reports, submit reports electronically to accrediting body 605, or adjust criteria distribution via the website on accreditation coordinator's computing device 640. Department user 645 can create rubrics, develop syllabi or goal lists, or review and adjust content mapping via the website on department user's computing device 655. Facilitator 660 can review and adjust content mapping and enter curricular materials via the website on facilitator's computing device 670. Instructor 675 can import curricular materials via the website on instructor's computing device 685. Each of computing devices 620, 640, 655, 670 and 685 communicate via internet 690 or any other communication network with server 695, which hosts the website and includes software to run embodiments of the present invention including, but not limited to, those shown and described with reference to FIGS. 1, 3, 4, 5, 7 and 8. Server 695 may comprise a single or any number of network servers, located together or apart in distributed fashion, in electrical communication with computing devices 620, 640, 655, 670 and 685.

Figure 7:
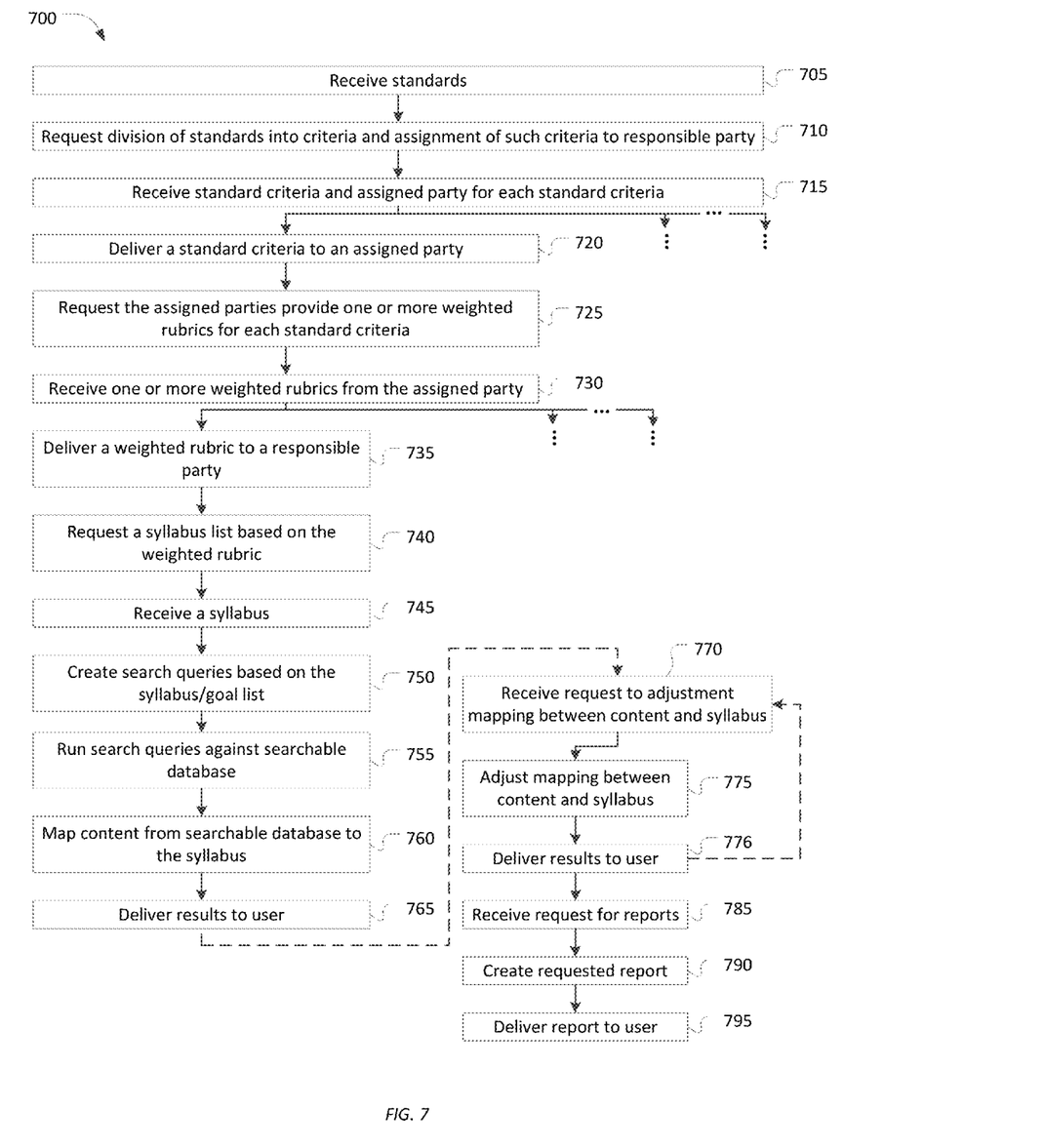
FIG. 7 is a flowchart of a method of analyzing a plurality of curricular materials to determine the sufficiency of a curriculum in meeting a set of standards from the perspective of the server executing the method according to an exemplary embodiment of the present invention.

An exemplary embodiment of a method of analyzing a plurality of academic curricular materials to determine the sufficiency of the curricular materials in meeting academic accreditation standards is illustrated in the flowchart of FIG. 7. Again, in this exemplary embodiment the entity is an academic institution and the standard-setting organization is an accrediting body. These are given for exemplary purposes only and the type of entity may be any entity that is attempting to meet a set of standards and the standards organization may be any entity that promulgates a set of standards. The method is illustrated from the perspective of a computer device (or server) running the software program. Different embodiments can take one or more inputs from one or more users during analysis of the content of the searchable database against the accreditation standards. The embodiment described here, method 700, takes a number of user inputs, which will be illustrated with respect to the exemplary users shown and described in FIG. 6; however, other implementations in which one or more of the user-input steps are automated are also contemplated. As shown in FIG. 7, standards are received by method 700 in operation 705. These standards can be input by, for example, accreditor user 610 of accrediting body 605 or by accreditation coordinator 630 at academic institution 625. Method 700, in operation 710, then requests, via a user interface, that the user divide the standards into criteria and assign each criteria to a responsible party. The user requested to divide and assign can, for example, be accreditation coordinator 630. The responsible party can be a user from one of the academic institution's departments—for example department user 645. Once the user (e.g. accreditation coordinator 630) inputs the criteria and designates the responsible party (e.g. department user 645) in operation 715, method 700 delivers each criteria to the responsible party, via a user interface in operation 720, and requests that each responsible party provide one or more weighted rubrics for its criteria in operation 725. The responsible party (e.g. department user 645) then, in operation 730, inputs one or more weighted rubrics, via the user interface, and the system, in operation 735, delivers the weighted rubric to a responsible party, via a user interface, and, in operation 740, requests a syllabus from the responsible party. Here, the responsible party can be facilitator 660 or department user 645. Once the responsible party (e.g. facilitator 660 or department user 645) inputs the syllabus in operation 745, method 700 can automatically create search queries based on the syllabus in operation 750. Natural language processing, vocabulary and phrase matching (similar to use of a thesaurus), machine learning, and other artificial intelligence technologies can be employed to create these search queries. Subject-specific dictionaries can be used to determine alternative language to use in the search queries. In addition, the occurrence frequency of keywords in the weighted rubrics can be used to determine the relevance of the search results and thereby enhance the search query. These search queries can then be run on the searchable database in operation 755. The content that results from the queries can be mapped to the syllabus using keyword and phrase matching in operation 760. The results of the mapping along with fundamental grading based on keyword and phrase matching can be delivered/displayed to the user in operation 765. The mapping can be reviewed and adjusted by the user. If a request is received to adjust mapping between the syllabus and the content in operation 770, then method 700, in operation 775, adjusts the mapping accordingly and the adjusted results are delivered to the user in operation 776. This process can be repeated as requested by the user. Reports can also be generated by the system upon request by a user. If a request for a report is received in operation 785, the requested report is created in operation 790 and then delivered to the user in operation 795.

Figure 8:
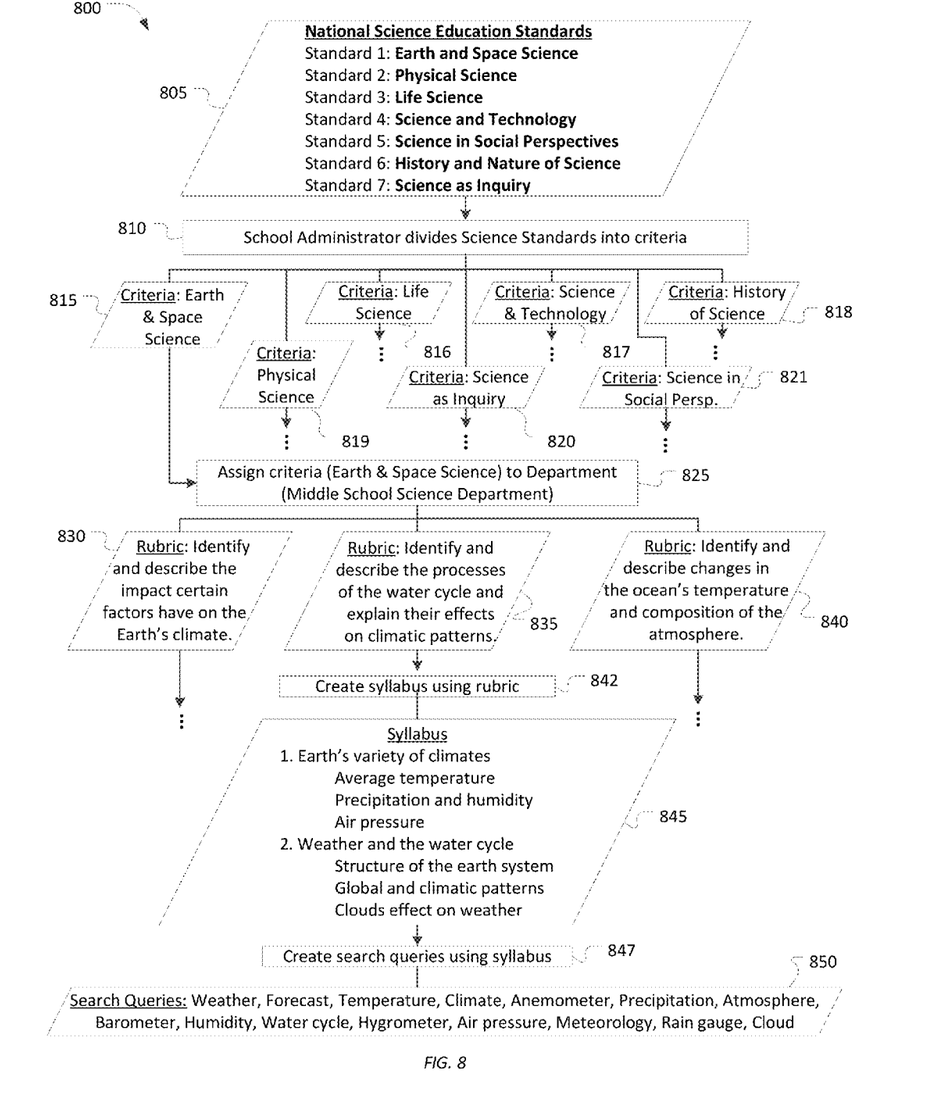
FIG. 8 is a flowchart of an exemplary execution of a method of analyzing a plurality of curricular materials to determine the sufficiency of a curriculum in meeting a set of standards using National Science Education Standards according to an exemplary embodiment of the present invention.
Figure 9:
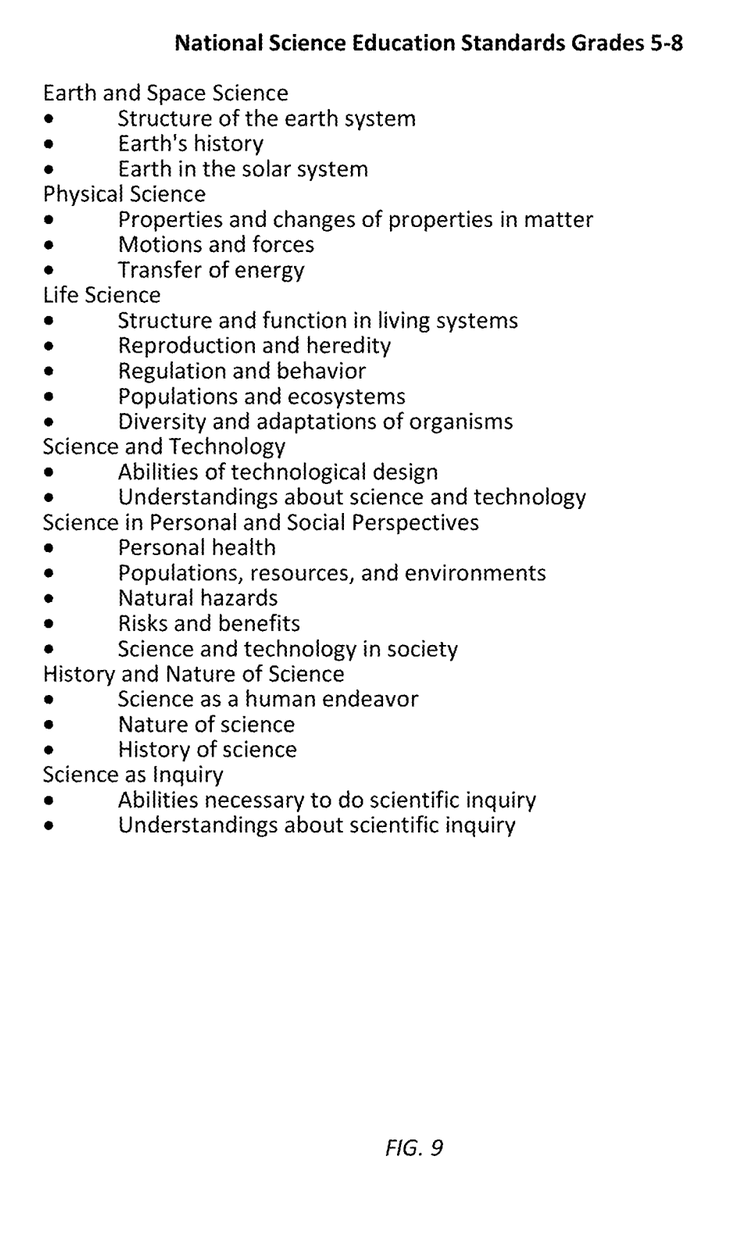
FIG. 9 is an example of a set of standards that could be used in embodiments of the present invention.

FIG. 8 illustrates an exemplary implementation using National Science Education Standards for grades five through eight. As illustrated, the National Science Education Standards 805 are received by method 800. An example of what standards 805 may look like in shown in FIG. 9. Method 800 may divide standards 805 automatically or a school administrator may use the system's user interface to divide standards 805 according to different departments or sub-departments within the school in operation 810. In this exemplary embodiment, standards 805 are divided into seven criteria: Earth and Space Science 815; Physical Science 819, Life Science 816; Science and Technology 817; Science in Social Perspectives 821; History of Science 818; and Science as Inquiry 820. Each of criteria 815-821 are then assigned to the department or sub-department responsible for the criteria. In this example, Earth and Space Science criteria 815 is assigned to the middle school's science department in operation 825. Once assigned, method 800 then automatically, or with the assistance of a member of the science department through the user interface, creates a number of rubrics based on the criteria. Three example rubrics are shown: rubric 830 (identify and describe the impact of certain factors have on the Earth's climate); rubric 835 (identify and describe the processes of the water cycle); and rubric 845 (explain their effects on climate patterns). Once the rubrics are established, syllabus 845 is created from rubric 842 in operation 842. This can be done automatically or with the assistance of a member of the science department. An example syllabus for rubric 835 includes (1) Earth's variety of climates including average temperature, precipitation and humidity, and air pressure; and (2) weather and the water cycle including structure of the earth system, global and climatic patterns, and clouds effect on weather. Syllabus 845 is used to automatically create search queries 850 in operation 847. In this example, search queries 850 include weather, forecast, temperature, climate, anemometer, precipitation, atmosphere, barometer, humidity, water cycle, hygrometer, air pressure, meteorology, rain gauge, and cloud.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A computer system adapted to determine the sufficiency of the curriculum in meeting a set of standards, comprising:
a processor in electrical communication with a memory;
wherein said memory comprises computer readable non-transitory memory containing computer readable instructions for execution by said processor that cause the system to perform:
importing a plurality of curricular materials into a searchable database;
receiving a set of standards;
parsing a criteria from the set of standards;
creating a rubric based on the criteria, wherein the rubric comprises at least one rubric element that fulfills the criteria;
creating a syllabus based on the rubric, wherein the syllabus comprises at least one syllabus element;
creating at least one search query based on each of the at least one syllabus element;
running the at least one search query against the searchable database to obtain at least one content item from the plurality of curricular materials that relate to the at least one syllabus;
mapping the at least one content item from the searchable database to the related syllabus element;
delivering the results of the mapping to a user via a user interface;
wherein the computer system determines the sufficiency of the curriculum in meeting the set of standards;
wherein the operation of importing a plurality of curricular materials into a searchable database comprises:
receiving the plurality of curricular materials in electronic form;
converting any non-text materials in the plurality of curricular materials to text;
tagging each of the plurality of text-form curricular materials with at least one identifier; and
saving each of the plurality of tagged, text-form curricular materials to the searchable database.

2. The computer system of claim 1, wherein the identifier comprises a link to the original form of the curricular materials.

3. A computer system adapted to determine the sufficiency of the curriculum in meeting a set of standards, comprising:
a processor in electrical communication with a memory;
wherein said memory comprises computer readable non-transitory memory containing computer readable instructions for execution by said processor that cause the system to perform:
importing a plurality of curricular materials into a searchable database;
receiving a set of standards;
parsing a criteria from the set of standards;
creating a rubric based on the criteria, wherein the rubric comprises at least one rubric element that fulfills the criteria;
creating a syllabus based on the rubric, wherein the syllabus comprises at least one syllabus element;
creating at least one search query based on each of the at least one syllabus element;
running the at least one search query against the searchable database to obtain at least one content item from the plurality of curricular materials that relate to the at least one syllabus;
mapping the at least one content item from the searchable database to the related syllabus element;
delivering the results of the mapping to a user via a user interface;
wherein the computer system determines the sufficiency of the curriculum in meeting the set of standards, and;
wherein the operation of importing a plurality of curricular materials into a searchable database comprises:
receiving the plurality of curricular materials in electronic form;
converting any non-text materials in the plurality of curricular materials to text;
extracting from each of the plurality of curricular materials a plurality of strings of text;
grouping the strings of text belonging to each of the plurality of curricular materials;
tagging each of the groupings with at least one identifier; and
saving the each of the tagged groupings to the searchable database.

4. A computer system adapted to determine the sufficiency of the curriculum in meeting a set of standards, comprising:
a processor in electrical communication with a memory;
wherein said memory comprises computer readable non-transitory memory containing computer readable instructions for execution by said processor that cause the system to perform:
importing a plurality of curricular materials into a searchable database;
receiving a set of standards;
parsing a criteria from the set of standards;
creating a rubric based on the criteria, wherein the rubric comprises at least one rubric element that fulfills the criteria;
creating a syllabus based on the rubric, wherein the syllabus comprises at cause the system to perform:
importing a plurality of curricular materials into a searchable database;
receiving a set of standards;
parsing a criteria from the set of standards;
creating a rubric based on the criteria, wherein the rubric comprises at least one rubric element that fulfills the criteria;
creating a syllabus based on the rubric, wherein the syllabus comprises at least one syllabus element;
creating at least one search query based on each of the at least one syllabus element;
running the at least one search query against the searchable database to obtain at least one content item from the plurality of curricular materials that relate to the at least one syllabus;
mapping the at least one content item from the searchable database to the related syllabus element;
delivering the results of the mapping to a user via a user interface;
wherein the computer system determines the sufficiency of the curriculum in meeting the set of standards;
wherein the at least one syllabus element has a weight and wherein the weight of the at least one syllabus element is determined according to the relative importance of the at least one syllabus element in fulfilling the criteria.

5. A computer system adapted to determine the sufficiency of the curriculum in meeting a set of standards, comprising:
a processor in electrical communication with a memory;
wherein said memory comprises computer readable non-transitory memory containing computer readable instructions for execution by said processor that standards, wherein the grade is based on the number of content items mapped to the at least one syllabus elements and the relative weight of the syllabus elements.

6. The computer system of claim 5, further comprising:
assigning a grade on the sufficiency of the curriculum in meeting the set of least one syllabus element;
creating at least one search query based on each of the at least one syllabus element;
running the at least one search query against the searchable database to obtain at least one content item from the plurality of curricular materials that relate to the at least one syllabus;
mapping the at least one content item from the searchable database to the related syllabus element;
delivering the results of the mapping to a user via a user interface;
wherein the computer system determines the sufficiency of the curriculum in meeting the set of standards;
wherein the at least one rubric element has a weight and wherein the weight is determined according to the relative importance of the rubric element in fulfilling the criteria.

7. A method of determining the sufficiency of a curriculum in meeting a set of standards, comprising:
importing a plurality of curricular materials into a searchable database;
receiving a set of standards;
parsing a criteria from the set of standards;
creating a rubric based on the criteria, wherein the rubric comprises at least one rubric element that fulfills the criteria;
creating a syllabus based on the rubric, wherein the syllabus comprises at least one syllabus element;
creating at least one search query based on each of the at least one syllabus element;
running the at least one search query against the searchable database to obtain at least one content item from the plurality of curricular materials that relate to the at least one syllabus;
mapping the at least one content item from the searchable database to the related syllabus element; and
delivering the results of the mapping to a user via a user interface:
wherein the operation of importing a plurality of curricular materials into a searchable database comprises:
receiving the plurality of curricular materials in electronic form;
converting any non-text materials in the plurality of curricular materials to text;
tagging each of the plurality of text-form curricular materials with at least one identifier; and
saving each of the plurality of tagged, text-form curricular materials to the searchable database.

8. The method of claim 7, wherein the identifier comprises a link to the original form of the curricular materials.

9. A method of determining the sufficiency of a curriculum in meeting a set of standards, comprising:
importing a plurality of curricular materials into a searchable database;
receiving a set of standards;
parsing a criteria from the set of standards;
creating a rubric based on the criteria, wherein the rubric comprises at least one rubric element that fulfills the criteria;
creating a syllabus based on the rubric, wherein the syllabus comprises at least one syllabus element;
creating at least one search query based on each of the at least one syllabus element;
running the at least one search query against the searchable database to obtain at least one content item from the plurality of curricular materials that relate to the at least one syllabus;
mapping the at least one content item from the searchable database to the related syllabus element; and
delivering the results of the mapping to a user via a user interface:
wherein the operation of importing a plurality of curricular materials into a searchable database comprises:
receiving the plurality of curricular materials in electronic form;
converting any non-text materials in the plurality of curricular materials to text;
extracting from each of the plurality of curricular materials a plurality of strings of text;
grouping the strings of text belonging to each of the plurality of curricular materials;
tagging each of the groupings with at least one identifier; and
saving the each of the tagged groupings to the searchable database.

10. A method of determining the sufficiency of a curriculum in meeting a set of standards, comprising:
importing a plurality of curricular materials into a searchable database;
receiving a set of standards;
parsing a criteria from the set of standards;
creating a rubric based on the criteria, wherein the rubric comprises at least one rubric element that fulfills the criteria;
creating a syllabus based on the rubric, wherein the syllabus comprises at least one syllabus element;
creating at least one search query based on each of the at least one syllabus element;
running the at least one search query against the searchable database to obtain at least one content item from the plurality of curricular materials that relate to the at least one syllabus;
mapping the at least one content item from the searchable database to the related syllabus element; and
delivering the results of the mapping to a user via a user interface:
wherein the at least one rubric element has a weight and wherein the weight is determined according to the relative importance of the rubric element in fulfilling the criteria.

11. A method of determining the sufficiency of a curriculum in meeting a set of standards, comprising:
importing a plurality of curricular materials into a searchable database;
receiving a set of standards;
parsing a criteria from the set of standards;
creating a rubric based on the criteria, wherein the rubric comprises at least one rubric element that fulfills the criteria;
creating a syllabus based on the rubric, wherein the syllabus comprises at least one syllabus element;
creating at least one search query based on each of the at least one syllabus element;

running the at least one search query against the searchable database to obtain at least one content item from the plurality of curricular materials that relate to the at least one syllabus;

mapping the at least one content item from the searchable database to the related syllabus element; and delivering the results of the mapping to a user via a user interface;

wherein the at least one syllabus element has a weight and wherein the weight of the at least one syllabus element is determined according to the relative importance of the at least one syllabus element in fulfilling the criteria.

12. The method of claim 11, further comprising:

assigning a grade on the sufficiency of the curriculum in meeting the set of standards, wherein the grade is based on the number of content items mapped to the at least one syllabus elements and the relative weight of the syllabus elements.

* * * * *